US009400691B2

(12) United States Patent
Arai

(10) Patent No.: US 9,400,691 B2
(45) Date of Patent: Jul. 26, 2016

(54) PROCESS ALLOCATION MANAGEMENT APPARATUS, SYSTEM AND METHOD

(71) Applicant: FUJITSU LIMITED, Kawasaki-shi, Kanagawa (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 14/205,435

(22) Filed: Mar. 12, 2014

(65) Prior Publication Data

US 2014/0196052 A1 Jul. 10, 2014

Related U.S. Application Data

(63) Continuation of application No. PCT/JP2011/071281, filed on Sep. 16, 2011.

(51) Int. Cl.
G06F 9/50 (2006.01)
G06F 9/48 (2006.01)

(52) U.S. Cl.
CPC ............ *G06F 9/5011* (2013.01); *G06F 9/4856* (2013.01); *G06F 9/5027* (2013.01); *G06F 9/5044* (2013.01); *G06F 9/5083* (2013.01); *G06F 9/50* (2013.01)

(58) Field of Classification Search
None
See application file for complete search history.

(56) References Cited

U.S. PATENT DOCUMENTS

| 5,845,116 | A | 12/1998 | Saito et al. | |
|---|---|---|---|---|
| 6,578,064 | B1 | 6/2003 | Saito et al. | |
| 8,260,840 | B1 * | 9/2012 | Sirota | G06F 9/5061 370/216 |
| 8,321,558 | B1 * | 11/2012 | Sirota | G06F 9/5011 709/201 |
| 8,719,415 | B1 * | 5/2014 | Sirota | G06F 9/5061 709/221 |
| 2003/0115241 | A1 | 6/2003 | Saito et al. | |
| 2005/0050544 | A1 | 3/2005 | Saito et al. | |
| 2006/0190942 | A1 | 8/2006 | Inoue et al. | |
| 2008/0320487 | A1 | 12/2008 | Fontenot et al. | |
| 2010/0229161 | A1 | 9/2010 | Mori | |

FOREIGN PATENT DOCUMENTS

| JP | 7-282013 | 10/1995 |
|---|---|---|
| JP | 10-198643 | 7/1998 |
| JP | 11-024949 | 1/1999 |

(Continued)

OTHER PUBLICATIONS

Notification of Transmittal of Copies of Translation of the International Preliminary Report on Patentability (Form PCT/IB/338, Form PCT/IB/373 & Form PCT/ISA/237), PCT/JP2011/071281, 8 pages, dated Mar. 27, 2014.

(Continued)

*Primary Examiner* — Qing Wu
(74) *Attorney, Agent, or Firm* — Fujitsu Patent Center

(57) ABSTRACT

In the present invention, a management apparatus includes a unit configured to store management information including a throughput of each of a plurality of computers, a unit configured to acquire a request value which includes a throughput that is required for executing a program from a program execution computer to which execution of a program has been assigned among a plurality of computers, a selecting unit configured to select a computer of a throughput compliant with the request value from among a plurality of computers, and a switchover control unit configured to allocate the program allocated to the program execution computer to the selected computer.

16 Claims, 11 Drawing Sheets

(56) References Cited

FOREIGN PATENT DOCUMENTS

| | | |
|---|---|---|
| JP | 2002-108839 | 4/2002 |
| JP | 2006-216058 | 8/2006 |
| JP | 2009-003942 | 1/2009 |
| JP | 2010-204979 | 9/2010 |

OTHER PUBLICATIONS

International Search Report, mailed in connection with PCT/JP2011/071281 and mailed Dec. 6, 2011.
Japanese Office Action mailed Apr. 14, 2015 for corresponding Japanese Application No. 2013-533448, with partial English Translation, 5 pages.

* cited by examiner

| PARALLEL COMPUTER ENVIRONMENT NAME | COMPUTING NODE COUNT | COMMUNICATION FUNCTION LEVEL | ALLOCATED PROGRAM COUNT | ALLOCATED HIGHEST PRIORITY LEVEL | ALLOCATED LOWEST PRIORITY LEVEL |
|---|---|---|---|---|---|
| NODE A | 10,000 | 100 | 5 | 10 | 1 |
| : | : | : | : | : | : |

PROCESS ALLOCATION MANAGEMENT APPARATUS, SYSTEM AND METHOD

CROSS-REFERENCE TO RELATED APPLICATION

This application is a continuation application of International Application PCT/JP2011/071281 filed on Sep. 16, 2011 and designated the U.S., the entire contents of which are incorporated herein by reference.

FIELD

The present invention relates to a computer system.

BACKGROUND

A computer can take a variety of configurations matching with an application or a purpose of a system. Then, a throughput or a hardware resource etc. is different corresponding to a configuration of the computer. For example, a parallel computer is considered by way of one example of the computer. The parallel computer can take a variety of system architecture depending on the number of computing nodes or a network configuration for establishing connections between the computing nodes. Further, a computer system can be also configured by combining computers having multiple configurations and the parallel computer together.

DOCUMENTS OF PRIOR ARTS

Patent Document

[Patent document 1] Japanese Laid-Open Patent Publication No. 2006-216058
[Patent document 2] Japanese Laid-Open Patent Publication No. 2010-204979

SUMMARY

One aspect of the technology of the disclosure can be exemplified by a management apparatus configured to manage allocation of processes to a plurality of computers each having a different throughput. The management apparatus includes a unit configured to store management information containing respective throughputs of the plurality of computers; a unit configured to acquire a request value containing the throughput requested for executing a program from a program execution computer, to which execution of the program is allocated, in the plurality of computers; a selecting unit configured to select the computer having the throughput suited to the request value from within the plurality of computers; and a switchover control unit configured to allocate the program allocated to the program execution computer to the selected computer.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

In the case of utilizing a computer system configured by combining computers having a variety of configurations, there is room for improvement in terms of using efficiency of the computer system on the whole as the case may be. For example, such a case is considered that a plurality of programs is executed on the computer system configured by combining the computers having the variety of configurations. Herein, it is assumed that the respective proper computers are allocated to and thus execute a plurality of computer programs (which will hereinafter be simply termed the programs) to be executed.

In this instance, the following cases can arise in the respective programs to be executed.

(1) A case is that one program exploits some portions of hardware resources of the allocated computers, and the remaining is still unused. This is, e.g., a case in which some of a plurality of computing nodes of a parallel computer are used, and the remaining computing nodes are still unused.

(2) Another case is that communications between the computing nodes are not performed, and a network via which to establish connections between the computing nodes is not utilized in employing the computers including the plurality of computing nodes as in the case of the parallel computer. An alternative case is that the communications between the specified computing nodes are performed limitedly, while the communications between other computing nodes are not conducted.

Accordingly, the conventional computer system has an instance in which the computer system is not efficiently utilized in the case of executing the plurality of programs in the computer system including the plurality of computers taking the different configurations.

A computer system according to one aspect of an embodiment will hereinafter be described with reference to the drawings. A configuration of the following embodiment is an exemplification, and the present computer system is not limited to the configuration of the embodiment.

COMPARATIVE EXAMPLE

Figure 1:
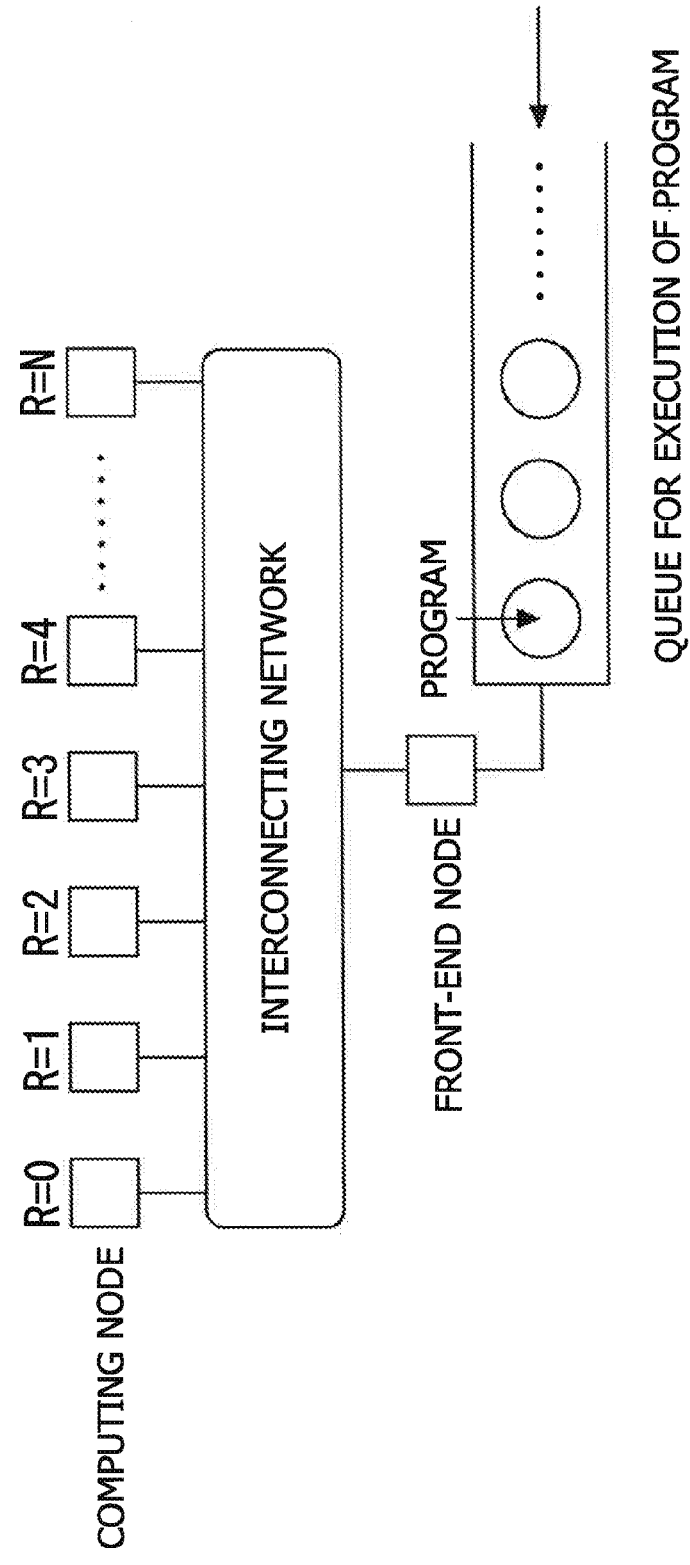
FIG. 1 is a diagram illustrating architecture of a computer system according to a comparative example.

FIG. 1 illustrates architecture of a computer system according to a comparative example. The computer system in the comparative example is configured by connecting a plurality of computing nodes represented by R=0 through R=N to a front-end node that manages executing programs on the computing nodes via an interconnecting network.

Herein, there are no particular limits to a configuration of the computing nodes and the front-end node. Accordingly, the computing nodes and the front-end node may be what are called, e.g., blade servers and may also be general type personal computers.

Figure 2:
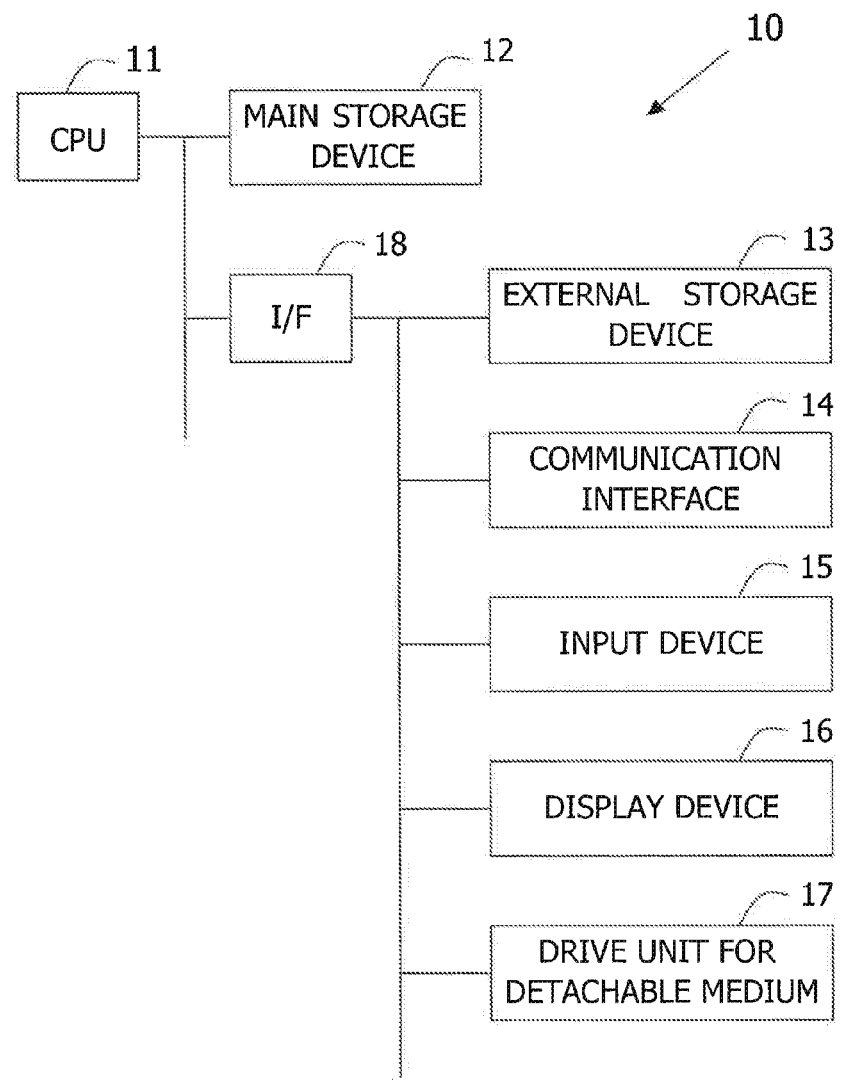
FIG. 2 is a diagram illustrating a configuration of a computer.

FIG. 2 illustrates a configuration of a computer 10 that can be used as the computing node or the front-end node. Each of the computing node and the front-end node includes a Central Processing Unit (CPU) 11, a main storage device 12 and external devices connected thereto via an interface (I/F) 18, and executes an information process according to a program. The external devices can be exemplified by an external storage device 13 and a communication interface 14. The external storage device 13 can be exemplified such as a hard disk and a Solid State Drive (SSD). The computing nodes and the front-end node are connected to the interconnecting network via the communication interface 14.

Further, each of the computing node and the front-end node may have a user interface built up by an input device 15, a display device 16, etc. The input device 15 is exemplified by a keyboard, a pointing device, etc. Moreover, the display device 16 is exemplified by a liquid crystal display, an electroluminescence panel, etc. Still further, each of the computing node and the front-end node may be provided with a drive unit 17 for a removable storage medium. The removable storage medium is exemplified such as a Blu-ray disc, a Digital Versatile Disk (DVD), a Compact Disc (CD) and a flash memory card. Note that the single I/F 18 is illustrated in the example of FIG. 2, however, plural types of plural interfaces may also be provided as the I/Fs 18.

Furthermore, no particular limit exists with respect to the interconnecting network. The interconnecting network may also be, e.g., a Local Area Network (LAN) etc. that is connected via a Network Interface Card (NIC). Moreover, the interconnecting network may also be a network connected via a communication interface such as Fibre Channel and InfiniBand.

Incidentally, one of characteristics of a parallel computer illustrated in FIG. 1 lies in, e.g., a data communication processing function between the plurality of computing nodes and a high-speed and large-capacity computing node. The program utilizing the parallel computer makes a processing speed faster than the processing speed of the computer taking the single node architecture by exploiting the characteristics described above.

It does not, however, mean that functions of the parallel computer are used from a point of time when starting the execution of the program down to a point of time when finishing the execution throughout. For example, when executing the program, the following statuses may occur temporarily or from a certain point of time onward. For instance, such a case is assumed that one program is assigned to the plurality of computing nodes of the parallel computer as in FIG. 1.

(1) A case where the program utilizes a part of the assigned computing nodes.
(2) A case where the program does not, though utilizing the computing nodes, perform communications between the computing nodes.
(3) A case where the program performs the communications between the computing nodes. On the parallel computer as a whole, however, the communications are conducted in the way of being limited to between computing nodes in a group but are not performed between other computing nodes.

Namely, such a situation can occur that the parallel computer is used, but nevertheless the characteristics thereof are not sufficiently utilized. Generally, the parallel computer is shared for use among a plurality of users, and, if the program does not exploit the characteristics thereof even though temporarily, it follows that a futility potentially exists in terms of the utility.

Figure 3:
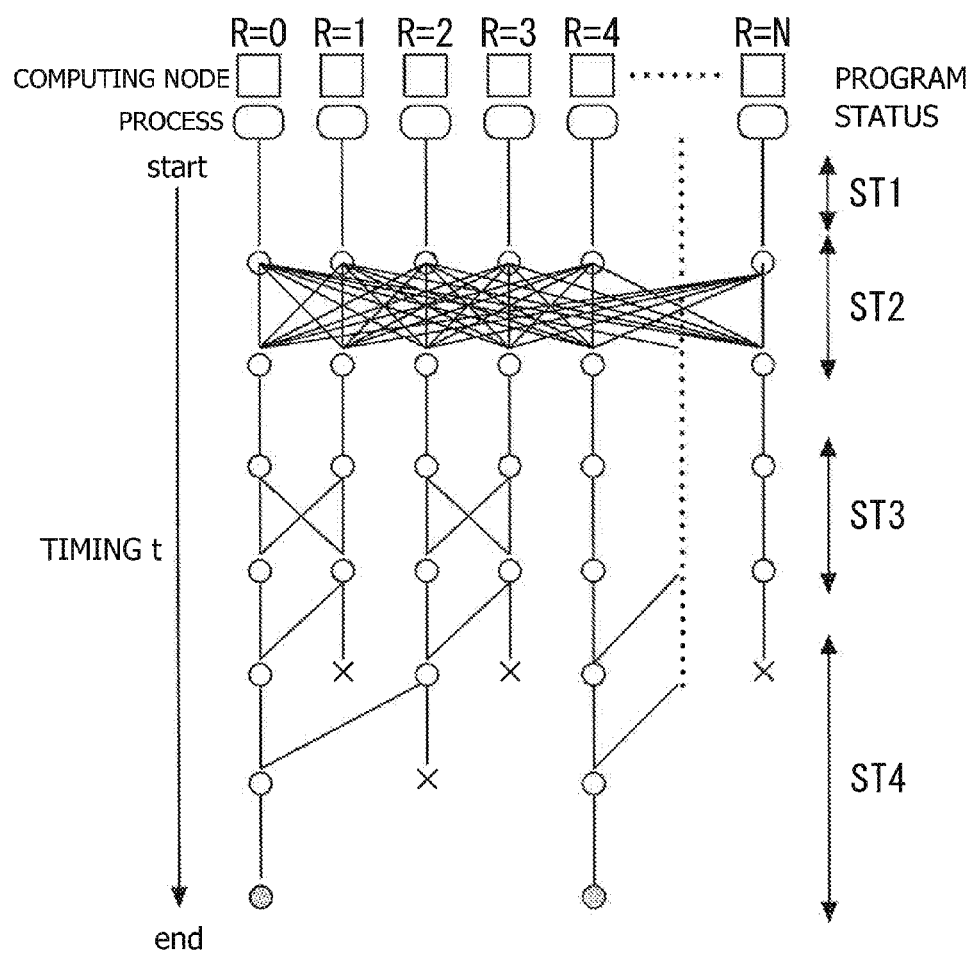
FIG. 3 is a diagram illustrating an execution state of a program on a parallel computer.

FIG. 3 illustrates a state of how the program is executed on the parallel computer. FIG. 3 illustrates statuses of the program executed on the computing nodes represented by R=0 through R=N along a time base (vertical axis) with timing t being indicated. The program is executed as PROCESSES on the respective computing nodes. Processes of the program executed in the respective PROCESSES are conceptually depicted by circles. Further, the communications between the computing nodes are depicted by lines that connect the circle to another circle in a crosswise or oblique direction. Still further, the statuses of the individual computing nodes of the parallel computer are indicated by symbols such as ST1-ST4 in a way that segments a period in a time-base direction.

An example in FIG. 3 is that the program at first starts being executed as the PROCESSES on all the computing nodes when initiating the execution. Generally, immediately when starting the execution of the program, the communications between the PROCESSES do not occur (status ST1). One of advantages of the parallel computer is a large-scale communication process between the computing nodes. To be specific, as in a status ST2, a status of performing a large-scale communication process between the PROCESSES on the respective computing nodes is said to be a status of exploiting one advantage of the parallel computer. It does not mean that the program on the parallel computer always conducts the communications in this manner, but such statuses are probable as a temporary non-communication status and a status where the communications are, though performed, carried out on a small scale between some computing nodes (e.g., status ST3).

Furthermore, there is also a case of becoming a status (e.g., a status ST4) of using some computing nodes after stopping halfway the use of the initially assigned computing nodes. When considering the program execution status such as this, the parallel computer is not necessarily said to be effectively used in the statuses other than ST2 in FIG. 3. Accordingly, such a problem can arise that the computing nodes and hardware for the communications are not effectively used depending on a time zone.

EXAMPLE 1

A computer system according to a first example an example 1 will be described with reference to FIGS. 4 through 9. The computer system in the example 1 accepts a report of execution states from the program being executed underway on the computer system, and selects an execution environment suited to each execution state of the program. Then, the computer system in the example 1 changes the environment for executing the program to this selected execution environment.

Figure 4:
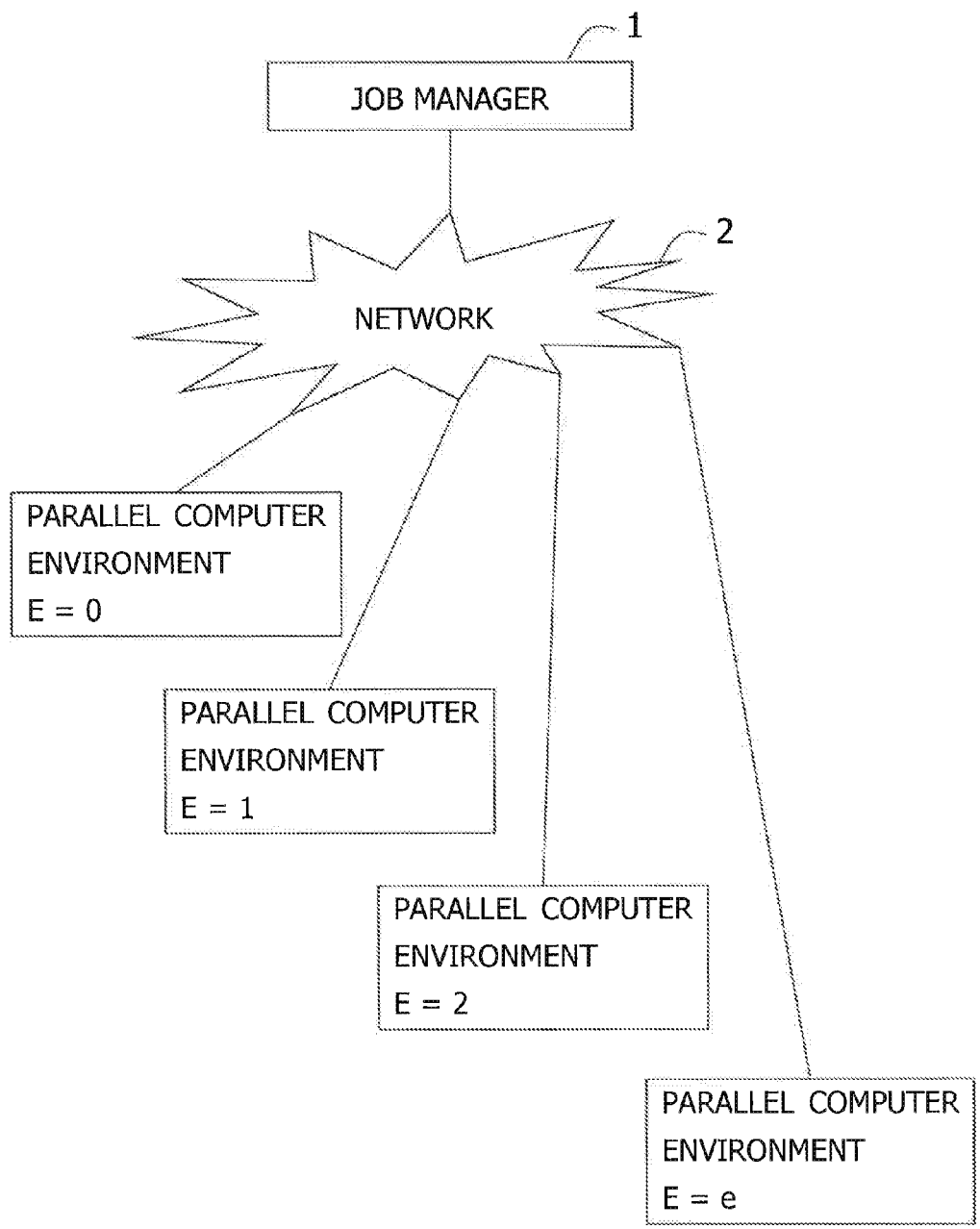
FIG. 4 is a diagram illustrating the architecture of the computer system in an example 1.

FIG. 4 illustrates a diagram of architecture of the computer system in the example 1. This computer system includes a plurality of parallel computer environments represented by E=0 through E=e and a computer called a job manager 1 for management, which is connected to via a network 2 to the plurality of parallel computer environments. The plurality of parallel computer environments is one example of a plurality of computers having different throughputs. Further, the job manager 1 is one example of a management device.

Herein, each of the plurality of parallel computer environments represented by E=0 through E=e is the parallel computer as illustrated in, e.g., FIG. 1. Each of the parallel computer environments E=0 through E=e is includes, for example, the plurality of computing nodes and the front-end node that manages executing the program on the computing nodes. Moreover, the plurality of computing nodes is connected to the front-end node via the interconnecting network. The configuration of each of the computing node and the front-end node is the same as that illustrated in FIG. 2.

As in FIG. 4, the computer system in the example 1 further connects each of the parallel computer environments to the job manager 1 via the network 2. The network 2 may be the same interconnecting network in FIG. 1, i.e., the network such as the LAN and the networks using the interfaces like the Fibre Channel and the InfiniBand. Moreover, the job manager 1 may also be the blade server, the personal computer, etc. similarly to the front-end node illustrated in FIG. 1. Accordingly, a configuration of the job manager 1 is the same as the configuration illustrated in FIG. 2.

Figure 5:
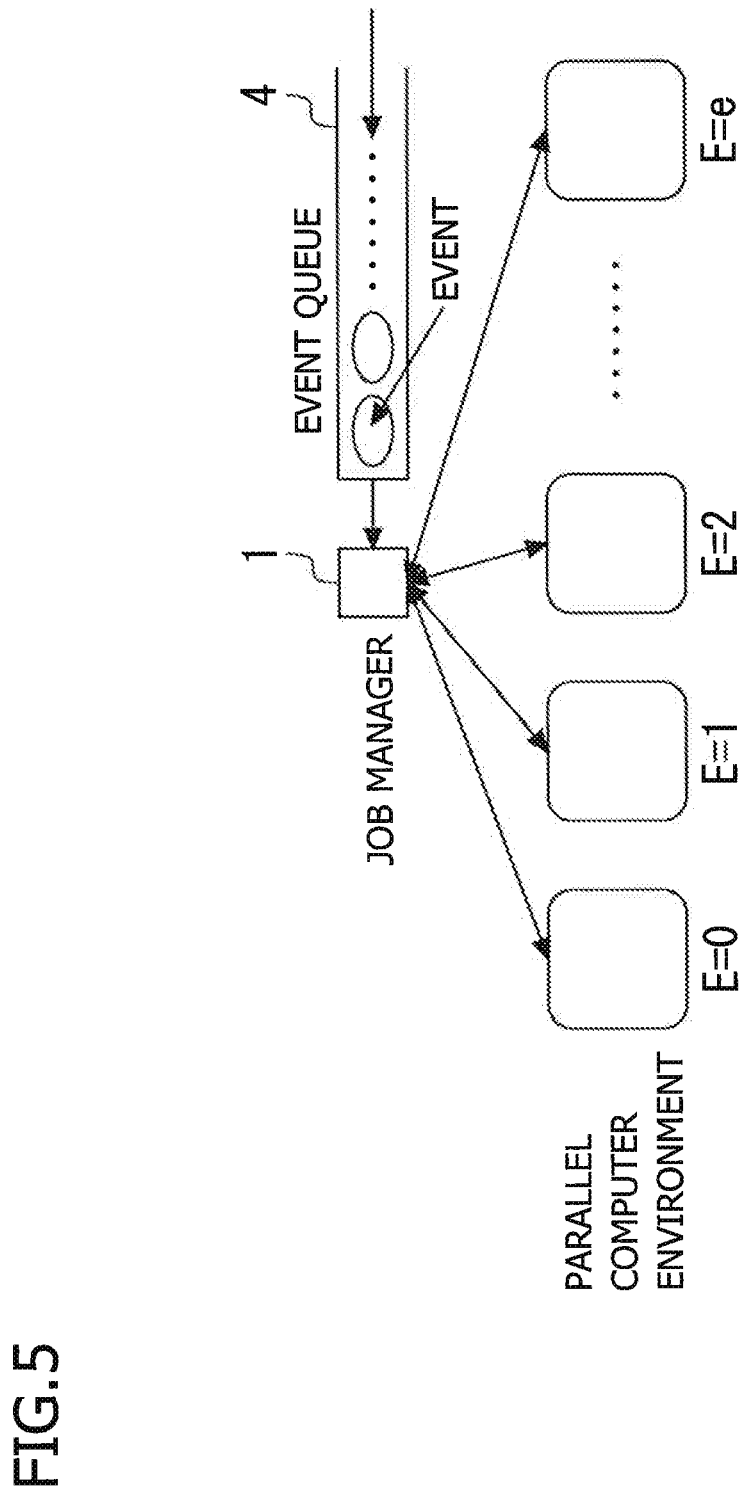
FIG. 5 is a diagram illustrating functions of the computer system.

FIG. 5 depicts functions of the computer system. In the computer system, a plurality of programs is executed in parallel. The job manager 1 allocates the respective programs to the parallel computer environments (E=0 through E=e) on the basis of the execution states of the individual programs.

The programs allocated to the parallel computer environments (E=0 through E=e) are registered in a queue for execution and then executed according to priority levels allocated thereto. Then, each of the programs executed in the respective parallel computer environments reports the execution state to the job manager 1. For example, each program contains a description of a code called a "state description" for notifying the job manager 1 of a request value of a computer resource for the execution. The computer resource is one example of a throughput. The computer resource can be exemplified by a computing node count, a capacity of the main storage device, a communication speed between the computing nodes, a communication bandwidth between the computing nodes, and so on. Further, the request value of the computer resource for the execution is one example of a request value containing a requested throughput for executing the program. The "requested throughput for executing the program" connotes the request value for which a program execution requester requests the parallel computer environment to which the program is allocated. This request value is, e.g., a request value set for the program execution requester to obtain an execution result in a desired period of time.

For example, when a program being executed underway on a certain computing node existing in the parallel computer environment (E=e) reaches the "state description", a library function being resident in a memory of this computing node is invoked. In the library function, the computing node transmits, to the job manager 1, the program execution state or the request value of the proper computer resource corresponding to the execution state. "The program execution state or the request value of the proper computer resource corresponding to the execution state" will hereinafter be simply referred to as "transmission information". Moreover, the computing node transmits a query about a change in program execution environment to the job manager 1 together with the transmission information. There is no limit to a method of the communications performed from the computing nodes to the job manager 1. For example, it may be sufficient that the query is transmitted from the computing node to the job manager 1 via the interconnecting network establishing the connections between the computing nodes as illustrated in FIG. 1 or via the network 2 to which the parallel computer environments are connected.

The communication method between the computing nodes and the job manager may involve using protocols as used for, e.g., the Fibre Channel, the InfiniBand, the LAN, etc. Further, any types of hierarchies may be utilized as the hierarchies for the protocols. For example, a dedicated program for the communications may be embedded in the library function, whereby the computing nodes and the job manager 1 may perform the communications with each other by use of MAC (Media Access Control) addresses. Moreover, the program for the computing nodes and the job manager 1 to perform the communications may be embedded in the library function, whereby the computing nodes and the job manager 1 may perform the communications with each other on, e.g., a TCP/IP (Transmission Control Protocol/Internet Protocol)-based application layer. Further, if the computing nodes and the job manager 1 implement a Remote Procedure Call (RPC) function, this RPC may be utilized. In any case, it may be sufficient to retain the MAC address, an IP address, a node name, etc. of the job manager 1 as parameters within each computing node. For instance, it may be sufficient that a destination address etc. is acquired from an Operating System (OS) of the computing node within the library function.

The job manager 1 receives, as an event, the queries about the changes in execution environments of the programs in parallel from the plurality of computing nodes of the plurality of parallel computer environments (E=0 through E=e). In this case, it can happen that the query event is transmitted corresponding to each execution state to the job manager 1 from the program executed on the plurality of computing nodes of one parallel computer environment. This is because the execution state of the program is different on every individual computing node. The job manager 1 has an event queue for processing the received query events in a way that sequences these events.

Namely, the query given from each individual program to the job manager 1 is fetched as the query event into the event queue. The job manager 1 sequentially processes the query events given from the respective programs (i.e., from the respective computing nodes) in accordance with the priority levels set in the event queue, and allocates the parallel computer environments (E=0 through E=e) in a way that corresponds to the request values of the computer resources, which are contained in the query event, to the respective programs.

As described above, the computer system momentarily collects, e.g., pieces of information on whether the execution states of the programs on the respective computing nodes are states of exploiting the characteristics of the parallel computer or not in order to increase utilization efficiency. Then, in the case of reaching a state where a first program does not exploit the characteristics of the parallel computer, the computer system shifts the execution of the first program to, e.g., the parallel computer environment having a more inferior function. Conversely, in the case of reaching a state where the execution of a second program requires the parallel computer having a higher function, the computer system shifts the execution of the second program to the parallel computer having the higher function. To be more specific, the job manager 1 selects the parallel computer environment suited to the query event, and instructs the program having issued the query event to switch over to the selected parallel computer environment from the parallel computer environment with the program being executed at the present.

The program performs self-reporting of a purport of reaching the state where the program does not exploit the characteristics of the parallel computer when in execution or a purport of reaching the state of exploiting again the higher function to the job manager 1 by the following method. Herein, the term "self-reporting" connotes, e.g., transmitting the information to the job manager 1 from the program being executed underway on the computing node. The job manager 1 receives the information transmitted to the job manager 1 itself from the program being executed underway on the computing node, and thereby detects the execution state of the program in each parallel computer environment.

<Transmission to Job Manager 1; State Description in Program>

The program contains a description of a process of transmitting the transmission information such as the execution state of the program and the request value of the computer resource for the execution to the job manager 1. The description of the process of transmitting the transmission information may be given when developing the program. When the CPU of the computing node reaches the descriptive portion of the process of transmitting the transmission information during the execution of the program, the computing node transmits the transmission information such as the execution state of the program at that point of time and the request value of the computer resource in accordance with this description. The following methods are considered each as the method of embedding the state description defined as the process of transmitting the transmission information.

(1) A programmer explicitly codes the process of transmitting the transmission information within the program.

(2) A compiler analyzes the program when the compiler compiles the program, automatically sets the execution state of the program, the request value of the computer resource, etc. that are contained in the transmission information, and adds a description to transmit the transmission information to the job manager 1.

For example, the compiler, when detecting a loop in the program, divides a loop count N into a plurality of partial loop count pn. The compiler generates, e.g., an execution form for segmenting each partial loop into different child PROCESSES and carrying out these child PROCESSES that are to be executed by the different computing nodes. At this time, a request value of the computing node count can be calculated such as: Loop Count N/Partial Loop Count pn. Further, the partial loop count pn can be determined from a period of execution time of the child PROCESSES that are executed in parallel. For instance, when the partial loop count pn is extremely small and the request value of the computing node count is excessively large, the communication time between the computing nodes is longer than the processing time of the partial loops executed by the respective computing nodes, resulting in a decrease in efficiency. The communication time between the computing nodes represents, e.g., a period of communication time for requesting the respective computing nodes to execute the partial loops, a period of communication time for acquiring execution results of the partial loops from the individual computing nodes, and so on. Such being the case, the partial loop count pn can be set to a length of time that becomes a proper magnification with respect to futile time for controlling the parallel computations such as the communication time between the computing nodes.

Moreover, the compiler calculates the communication speed between the computing nodes, the bandwidth, etc. from the futile time for controlling the parallel computations such as the communication time between the computing nodes and from a quantity of the information transferred and received between the computing nodes, and may thus establish a level of the communication function. Moreover, the compiler may select a network topology from the communication time between the computing nodes, the quantity of the information transferred and received between the computing nodes and the number of the computing nodes getting involved therein. Then, the compiler may reflect the selected network topology in the level of the communication function. For example, if a communication frequency among the five computing nodes is high, it may be sufficient that the communications can be performed simply in lengthwise and crosswise directions in a matrix configuration. Moreover, if the communication frequency among, e.g., the nine computing nodes is high, a network connected by a link also in a diagonal direction may be selected.

(3) Profile information of the program may also be used. For example, an analyzing program of the profile information may create a descriptive statement for specifying the execution state, the preferable computer resource, etc. from the profile information when executing the program in the past, and may add the created descriptive statement to the program. If the loop count N is fixed in the program, as described in the method (2), the compiler can set the proper computing node count when conducting the compilation. If the loop count N is defined as a dynamic parameter given during the execution in the program, however, the loop count N is not specified till the program is executed. If the loop count N is defined as the dynamic parameter in the program, the loop count N may be specified as an empirical value on the basis of the profile with the program being executed. Then, the loop count N may be handed as the empirical value over to the compiler. Further, if a plurality of loops exists or if a plurality of parameters to be handed over to the compiler exists other than the loop count N, the analyzing program for analyzing the profile information may generate a parameter group to be handed over to the compiler. The compiler may receive the parameter values as an analysis result, may execute the same compilation as by the method (2) and may determine the request value of the computing node count, the level of the communication function, and so on. However, binary codes in the execution form may be rearranged on the basis of the parameter group obtained as a result of analyzing the profile information by a binary code conversion program and the execution form may be executed on the plurality of computing nodes.

Each program transmits the execution state or the request value of the computer resource during the execution on each computing node to the job manager 1. The job manager 1 determines the parallel computer environment desirable for each program on the basis of the information transmitted from each parallel computer environment. The job manager 1, e.g., determines what program is desirable for being allocated to what execution environment. Such a process of the job manager 1 is also called a job management. The job manager 1 realizes, based on the job management, allocating the proper parallel computer environments during the execution of the plurality of programs in the whole computer system including the plurality of parallel computer environments. The job manager 1 determines whether the execution environment of the program being executed underway is changed or not in a manner that takes into consideration the execution state of the program or the request value of the computer resource that are detected in each parallel computer environment and each parallel computer environment where the program is executed at that point of time.

The following function is prepared for describing, within the program, the process of transmitting the execution state of the program or the request value of the computer resource to the job manager 1. The function name is, however, one example, and it does not mean that the processes of the computer system are limited to the function name given below.

The function is "parallel_run_level (N_PRIORITY, N_NODE, N_CONNECTION, ADJUST_P)";
where, meanings of respective parameters are given as follows. The parameter "N_PRIORITY" specifies the priority level for executing the program from the execution of this function onward. This priority level is to be, e.g., a relative value in the whole of the target parallel computer environments.

The parameter "N_NODE" specifies a desirable computing node count for executing the program from the execution of the function described above onward.

The parameter "N_CONNECTION" represents a desirable level of the communication function between the computing nodes for executing the program from the execution of the function described above onward. For example, if a value of "N_CONNECTION" is "100", this implies that the communication process having the highest possible function is desired for the program. Further, if the value of "N_CONNECTION" is "0", this implies that the program performs almost no communications.

The parameter "ADJUST_P" represents a strategy in such a case that the parallel computer environment as a target of the shifting destination does not be temporarily used due to a fault of the hardware. If a value of "ADJUST_P" is "TRUE", this designates that another parallel computer environment is selected and performs the execution. If the value of "ADJUST_P" is "FALSE", this designates a wait for the target parallel computer environment to get recovered.

These parameters may be constants. Furthermore, these parameters are not the constants but may also be values calculated by the program when in execution. If the execution of the program reaches an invoke point of this function, the execution state of the program, which is designated by the parameter described above, is reported to the job manager 1 from the program. The job manager 1 determines based on the present state of the computer system and on the reported values of these parameters whether to keep or change the parallel computer environment in which the program is executed from the reported execution state of the program.

On the computer system, the program, to which the job manager 1 allocates the parallel computer environment, contains the invoke statement of the function "parallel_run_level". The function "parallel_run_level" is implemented as a library function and may be linked to the program when compiling the program and thus creating an executable file.

<Program Execution Environment Changing Process Using Report of Execution State>

As explained in FIG. 5, the computing node transmits the execution state of the program or the request value of the computer resource to the job manager 1, whereby the job manager 1 changes the program execution environment. In the example 1, the parallel computer environment side executing the program and the job manager 1 carry out the process in parallel. It will hereinafter be assumed that the program is runs for the first time on the parallel computer environment E=e. Hereinafter, the parallel computer environment E=e will be simply termed the parallel computer E=e. Further, an event that "any one of the computing nodes of the parallel computer E=e executes the program" simply represents that "the parallel computer E=e executes the program".

Figure 6:
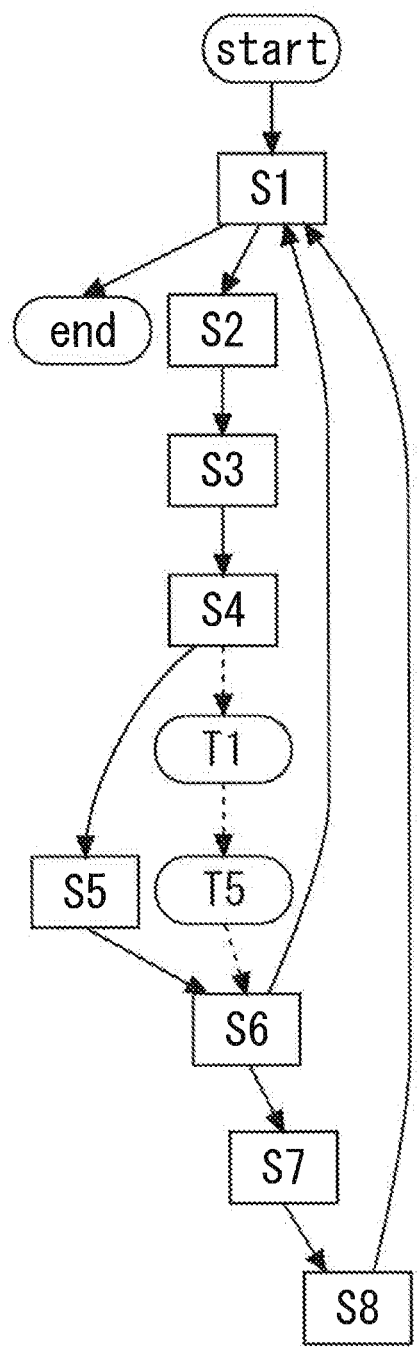
FIG. 6 is a diagram illustrating a processing flow on the side of a parallel computer environment.

FIG. 6 illustrates a processing flow on the side of the parallel computer environment. The parallel computer E=e completes processing when finishing the execution of the program (S1).

The parallel computer E=e, when reaching the invoke point of "parallel_run_level" during the execution of the program, executes the library function of "parallel_run_level" (S2).

The parallel computer E=e acquires the values of the respective parameters N_PRIORITY, N_NODE, N_CONNECTION and ADJUST_P when executing the program in the library function of "parallel_run_level" (S3).

The parallel computer E=e generates a query event for querying the job manager 1 about whether it is better to change the program execution environment in the library function of "parallel_run_level". Then, the parallel computer E=e transmits the generated query event to the job manager 1. Thereupon, the job manager 1 adds the transmitted query event to the event queue 4 of the job manager 1 (S4). More specifically, the computing node reaching the invoke point of the function "parallel_run_level" transmits the information given by the parameters of the function "parallel_run_level" to the job manager 1 through the communication function prepared in a run-time library.

The query event contains the following items of information. To be specific, the items of information contained in the query event are a present parallel computer environment number e, and the values of the parameters (N_PRIORITY, N_NODE, N_CONNECTION and ADJUST_P). The job manager 1 processes the query events by allocating the priority levels to the processes of the query events on the basis of values of N_PRIORITY of the respective query events added to the event queue 4.

Moreover, the parallel computer E=e executes a process of setting the program execution status to a temporary stop status till a return message to the query event comes from the job manager 1 in the library function of "parallel_run_level" (S5).

Then, when the return message to the query event is returned from the job manager 1, the parallel computer E=e sorts the processes on the basis of contents of the return messages as follows (S6).

When receiving the return message instructing that the program execution environment is not changed, the parallel computer E=e restarts executing the program from the temporary stop status, and loops control back to S1.

When receiving the return message instructing that the program execution environment is changed, the parallel computer E=e advances the control to S7. Then, the parallel computer E=e fetches an execution environment number e0 of the shifting destination out of the content of the return message instructing that the program execution environment is changed (S7).

Next, the parallel computer E=e saves a present execution image of the program in the main storage device or the external storage device. In this case, the "present execution image of the program" is what is called a context containing values of a register set in addition to the executable binary data (binary codes of the program). The context may contain, e.g., information called a check point indicating a point up to which the execution of the program is conducted.

It is desirable that a storage location of the present execution image of the program is an area where the data can be read and written from both of the parallel computer E=e defined as the present execution environment of the program and the parallel computer E=e0 defined as the execution environment of the shifting destination. Note that the area where the data can be read and written from both of the parallel computer E=e and the parallel computer E=e0 of the shifting destination is exemplified such as a shared memory and a shared disk of the computer system, a sharable storage device area on the network 2, the main storage device of the job manager 1 and the external storage device of the job manager 1.

However, the present execution image of the program may be temporarily stored in the main storage device of the parallel computer E=e defined as the present execution environment of the program or in the external storage device, and may be transferred to the main storage device of the parallel computer E=e0 defined as the execution environment of the shifting destination or to the external storage device. For example, the parallel computer E=e may temporarily store the present execution image in the main storage device of a front-end processor of the parallel computer E=e or in the external storage device. Then, the parallel computer E=e may transfer the present stored execution image to the main storage device of the front-end processor of the parallel computer E=e0 to the external storage device.

In order for the parallel computer E=e0 as the new execution environment to continue executing the program, the parallel computer E=e requests the parallel computer E=e0 to register an execution reservation of the program in the queue for the execution of the parallel computer execution environment e0 (S8). The parallel computer E=e0 processes the queue for the execution in a way that allocates the priority level to the execution of the program on the basis of the value of N_PRIORITY.

When the parallel computer E=e0 as the new execution environment starts the continuous execution of the program, the program iterates the processes from step S1 in the new execution environment E=e0. At this time, the program execution resumes by use of the values of the register set, the check point, etc., which are contained in the program execution image, i.e., the context.

Figure 7:
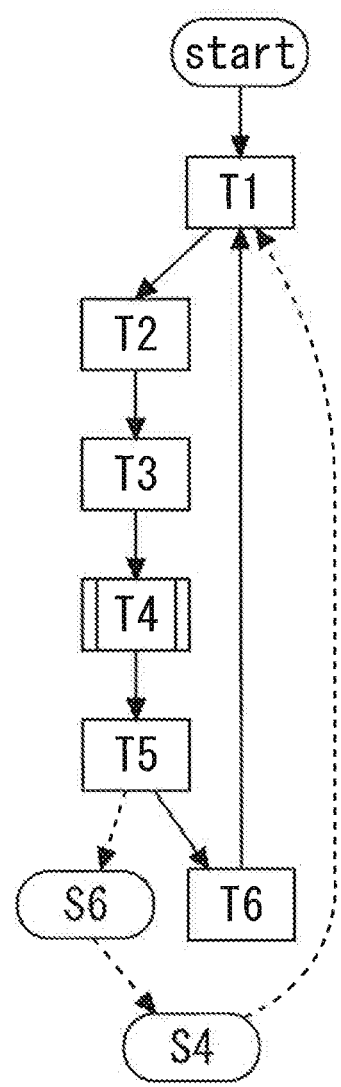
FIG. 7 is a diagram illustrating a processing flow on the side of a job manager.

FIG. 7 illustrates a processing flow on the side of the job manager 1. The job manager 1, if the event queue 4 is null, waits till the next query event arrives (T1). The query event will hereinafter be also simply termed the event. Whereas if the event queue 4 is not null, the job manager 1 takes an event Z out of the top of the event queue 4. Then, the job manager 1 advances the control to T2.

The job manager 1 takes the next information out of the event Z. Namely, the job manager 1 reads the environment number e of the parallel computer environment issuing the event and the parameter values (N_PRIORITY, N_NODE, N_CONNECTION, ADJUST_P) of the program issuing the event (T2). The CPU of the job manager 1 executes the process in T2 by way of one example of means to acquire a request value requested for executing the program.

Next, the job manager 1 generates an aggregation C of the program execution environment serving as a candidate of the changing destination of the program execution environment on the basis of the information taken out of the event Z (T3). The aggregation C has a possibility of containing the environment number e of the parallel computer environment issuing the event. Namely, an option not to shift is probable. The following is a method of generating the aggregation C.

The job manager 1 sets "n" as a value of the parameter N_NODE and "c" as a value of the parameter N_CONNECTION. Further, the job manager 1 sets "Ne" as the computing node count of each parallel computer environment e, and "Ce" as the level of the communication function. There is obtained the aggregation C of the parallel computer environments, which satisfies the following condition. Note that the computing node count of each parallel computer environment and the level of the communication function, etc. may be managed in, e.g., a parallel computer environment table illustrated in FIG. 9.

$$C=\{e|Ne>=n, \text{ and, } Ce>=c\};$$

Namely, the job manager 1 generates the aggregation of the parallel computer environments having resources equal to or larger than the computer resources designated in the parameters taken out of the event Z.

Next, the job manager 1 determines, from the aggregation C, the next execution environment e0 of the program, which corresponds to the event Z (T4). The CPU of the job manager 1 executes the process in T4 by way of one example of selecting means.

If "the aggregation C=a null aggregation", i.e., if the computer resources designated in the parameters do not be satisfactory even by selecting whatever parallel computer environment, the job manager 1 selects the parallel computer environment exhibiting the highest function from within the selectable parallel computer environments E=0 through E=e. If the computer resources designated in the parameters do not be satisfactory even by selecting whatever parallel computer environment, it can be said that the job manager 1 selects the parallel computer environment having the throughput suited to the request value within the possible range in terms of selecting the parallel computer environment exhibiting the highest function.

If the aggregation C contains the candidates for the plurality of parallel computer environments, the job manager 1 selects the parallel computer environment exhibiting the most inferior function from within the candidates contained in the aggregation C. In the case of determining the computer environment of the shifting destination, the job manager 1 executes also determining the following additional state. It can be said that the job manager 1 selects the parallel computer environment having the throughput suited to the request value within the possible range also in terms of selecting the parallel computer environment exhibiting the most inferior function from within the candidates contained in the aggregation C.

When determining from the parameter values that the environment is shifted to the computer environment having the level inferior to the present computer environment e and the program having the priority level higher than N_PRIORITY does not exist in the queue for the execution in the computer environment e, in this case the job manager 1 considers that there is an allowance in the present computer environment e and determines that the program execution environment is not shifted.

When the program having the priority level higher than N_PRIORITY runs in the computer environment of the shifting destination and there does not exist a program having the higher priority level than the program having the priority level higher than N_PRIORITY in the candidates for the computer environments exhibiting the function higher than the computer environment of the shifting destination, in this case the job manager 1 determines that the environment is shifted to the computer environment having the allowance and exhibiting the higher function than the computer environment of the shifting destination.

If unable to uniquely determine a functional superiority order of the computer environments, e.g., if there are a parallel computer environment g in which Nx=100; Cx=200 are given with respect to n=100; c=100 and a parallel computer environment h in which Ny=200; Cy=100 are given, it may be sufficient to determine which parallel computer environment, g or h, is preferentially used.

The job manager 1 notates the determined computer environment of the changing destination as "e0". If ADJUST_P is TRUE and if the computer environment e0 of the shifting destination does not be temporarily used due to the fault of the hardware, the job manager 1 excludes this computer environment e0 from the selection candidates and again executes the process in T4.

The job manager 1 transmits a message saying that the program with the execution being suspended is shifted to the computer environment e0 of the changing destination back to the parallel computer environment e issuing the event (T5). The CPU of the job manager 1 executes the process in T5 by way of one example of a switchover control unit.

At this time, if a relationship of e=e0 is established, the job manager 1 transmits the message to the parallel computer environment so as not to change the computer environment. Then, the job manager 1 loops the control back to T1 in order to process the next event (T6).

Figure 8:
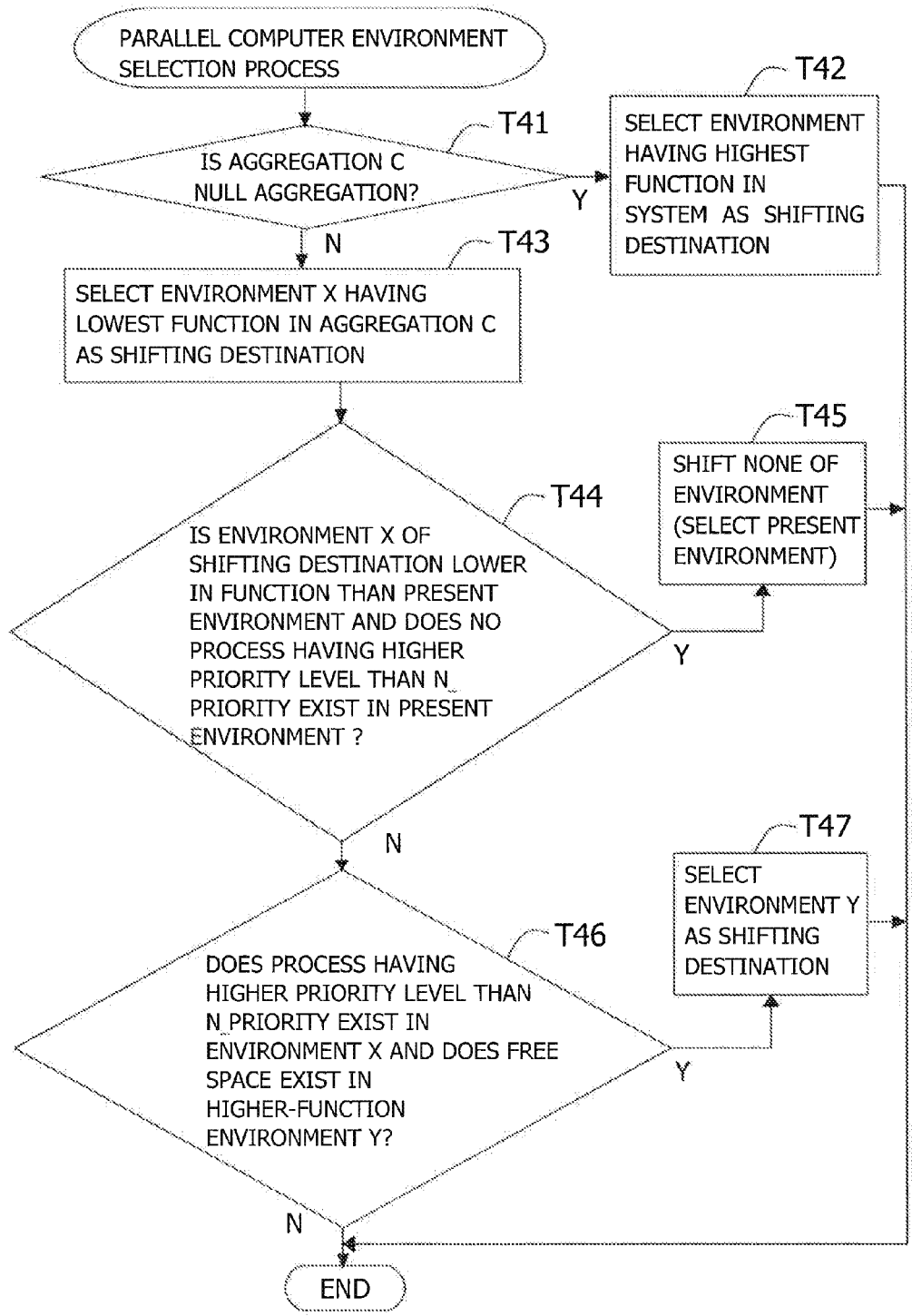
FIG. 8 is a flowchart illustrating details of a process of determining a next execution environment of the program.

FIG. 8 illustrates details of the process (T4 in FIG. 7) of determining the next execution environment e0 of the program from within the aggregation C in accordance with the information of the query event. In this process, the job manager 1 determines whether or not the aggregation C generated in the process T3, i.e., the aggregation C of the program execution environments becoming the candidates for the changing destinations of the program execution environment is the null aggregation (T41). If the aggregation C is the null aggregation, the job manager 1 selects the parallel computer environment having the highest function in the computer system as the parallel computer environment of the changing destination (T42). Then, the job manager 1 finishes processing.

Whereas if the aggregation C is not the null aggregation, the job manager 1 selects the parallel computer environment exhibiting the lowest function in the aggregation C as a parallel computer environment X of the changing destination (T43). Then, the job manager 1 determines whether such conditions are satisfied or not that the parallel computer environment X of the changing destination is lower in function than the present parallel computer environment and that a PROCESS having the higher priority level than N_PRIORITY is not executed in the present parallel computer environment (T44). If the conditions in T44 are satisfied, the job manager 1 determines that the parallel computer environment is not changed. This is because when the present environment has a free space and the parallel computer environment exhibiting the lower function has a less of allowance, it is better not to change the parallel computer environment. Namely, the present parallel computer environment is selected as the next parallel computer environment (T45). Then, the job manager 1 finishes processing. Note that the priority levels of the programs being executed underway in the respective parallel computer environments may be managed in, e.g., the parallel computer environment table illustrated in FIG. 9. The CPU of the job manager 1 executes the process in T45 by way of one example of a switchover inhibiting unit.

Moreover, whereas if the conditions in T44 are not satisfied, the job manager 1 determines whether such conditions are satisfied or not that a PROCESS having the higher priority level than N_PRIORITY is executed in the parallel computer environment X of the changing destination and that a parallel computer environment Y having the higher function than the parallel computer environment X has a free space (T46). Herein, a state of "the parallel computer environment Y has the free space" can be exemplified such that a PROCESS having the higher priority level than N_PRIORITY is not executed in the parallel computer environment Y.

If the conditions in T46 are satisfied, the job manager 1 selects the parallel computer environment Y having the higher function than the parallel computer environment X as the parallel computer environment of the changing destination (T47). This is because if the parallel computer environment having the higher function has the free space, an option of the effective use causes no problems in terms of the efficiency in the computer system as a whole, and in addition the program becoming the target of the query event can be executed at a higher speed. Then, the job manager 1 terminates processing.

Figures 9, 10:
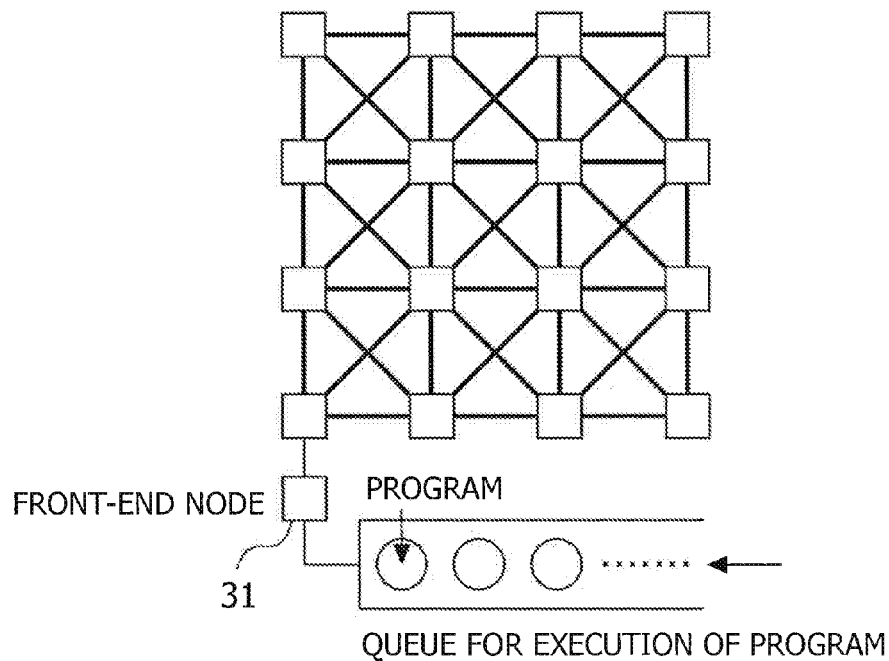
FIG. 9 is a diagram illustrating an example of data of a parallel computer environment table.
FIG. 10 is a diagram illustrating a parallel computer environment N16C100.

FIG. 9 illustrates an example of data in the parallel computer environment table. The parallel computer environment table is stored in, e.g., the main storage device of the job manager 1 or the external storage device. The main storage device of the job manager 1 or the external storage device, which store the parallel computer environment table, is one example of means to store management information containing a throughput. Further, the parallel computer environment table is one example of the management information.

FIG. 9 illustrates a table in which one row corresponds to one record that defines one parallel computer environment. As in FIG. 9, one record of the parallel computer environment table contains a "parallel computer environment name" field, a "computing node count" field, a "communication function level" field, an "allocation program count" field, an "allocated highest priority level" field and an "allocated lowest priority level" field.

The parallel computer environment name is information for identifying each individual parallel computer environment. The parallel computer environment name can be set as, e.g., a unique character string within the parallel computer environment table. Further, the parallel computer environment name may also be, e.g., a node name of the front-end node or an address on the network 2. For example, the parallel computer environment name may also be an Internet Protocol (IP) address of the front-end node, a MAC address of the communication interface of the front-end node, and so on.

The computing node count is the number of the computing nodes in the parallel computer environment specified by the parallel computer environment name. The communication function level is a level of the communication function in the parallel computer environment specified by the parallel computer environment name. The level of the communication function is set based on, e.g., the network topology, the bandwidth, the data transfer speed, etc.

The allocation program count is the number of the programs allocated to the parallel computer environment specified by the parallel computer environment name at the present point of time. The allocation program count changes corresponding to the process of the job manager 1. For instance, the job manager 1, when instructing the program to change the parallel computer environment to the parallel computer environment specified by the parallel computer environment name, may decrement the allocation program count in the parallel computer environment of a changing source by "1", to which this instructed program is allocated at the present time, and may increment the allocation program count in the parallel computer environment of the changing destination by "1".

However, each parallel computer environment, when receiving the allocation as the execution environment of each program, may notify the job manager 1 of the increment of the program allocation. Moreover, each parallel computer environment, when making a request for shifting the program being executed underway to another parallel computer environment and this shift request is accepted, may notify the job manager 1 of the decrement of the program allocation. The job manager 1 may change the allocation program count when receiving the notification of the increment of the program allocation or the notification of the decrement of the program allocation from each parallel computer environment. It can be said that as the allocation program count becomes larger, the parallel computer environment specified by the parallel computer environment name gets more congested.

The allocated highest priority level represents the highest priority level in the priority levels of the programs allocated at the present point of time to the parallel computer environment specified by the parallel computer environment name. It can be said that as the allocated highest priority level gets higher, it is harder for a newly allocated program to utilize the parallel computer environment. Conversely, it can be said that as the allocated highest priority level gets lower, such a possibility becomes higher that the parallel computer environment can be utilized by the newly allocated program.

The job manager 1, when sending, back to the program, a message saying that the parallel computer environment is shifted to the parallel computer specified by the parallel computer environment name, may change the allocated highest priority levels in the parallel computer environments before and after the change in a way that corresponds to the priority level of the program receiving the message. Further, each parallel computer environment, when accepting the allocation as the execution environment of each program, may notify the job manager 1 of the priority level of the allocated program. Furthermore, each parallel computer environment, when the request for shifting the program being executed underway to another parallel computer environment is made, the shifting request is accepted and the program allocation is deleted, may also notify the job manager 1 of the priority level of the program with the allocation being deleted. The job manager 1, when receiving the notification of the priority level allocated to the program or the notification of the priority level of the program with the allocation being deleted from each parallel computer environment, may change the allocated highest priority level.

The allocated lowest priority level represents the lowest priority level in the priority levels of the programs allocated at the present point of time to the parallel computer environment specified by the parallel computer environment name. It is understood that as the allocated lowest priority level becomes higher, more programs are allocated at the high priority levels. The allocated lowest priority level may be managed in the same way as the allocated highest priority level is.

<Effects>

As discussed above, the computer system enables the plurality of parallel computer environments to be effectively used. Each of the computing nodes in each parallel computer environment of the computer system, when executing the descriptive portion of the state in the program, transmits, to the job manager 1, the program execution state, the computing node count desirable for the program, the level of the communication function, etc., which are set in the descriptive portion of the state. This process enables the computer system to timely acquire the items of information on the executions states of the respective programs and the preferable computer resources.

The job manager 1 of the computer system shifts the execution of the program, of which the request level of the data communication function decreases temporarily or from a certain point of time onward, to the parallel computer environment exhibiting the low level of the data communication function. This process enables the job manager 1 to allocate the function of the parallel computer having the high data communication function to the program exhibiting the higher priority level.

The job manager 1 shifts the execution of the program having a small request count of the computing node count to the parallel computer environment having a small computing node count. This process enables the job manager 1 to allocate the function of the parallel computer to the program exhibiting the higher priority level.

The job manager 1 shifts the execution of the program, of which the request level of the data communication function increases temporarily or from a certain point of time onward, to the parallel computer environment exhibiting the high level of the data communication function. Through this process, in the computer system, the parallel computers can be effectively used.

The job manager 1 shifts the execution of the program, of which the required computing node count increases temporarily or from a certain point of time onward, to the parallel computer environment having the large computing node count, whereby the function of the large-scale parallel computer can be effectively used.

The plurality of parallel programs makes queries about whether the change of the parallel computer environment is needed or not by transmitting a plurality of query events, in which case the plurality of parallel computer environments is determined by taking the priority levels of the query events into consideration, and the whole computer system can be effectively used.

Further, as illustrated in T44 and T45, the job manager 1 determines whether such conditions are satisfied or not that the parallel computer environment X of the changing destination is lower in function than the present parallel computer environment and that a PROCESS having the higher priority level than N_PRIORITY is not executed in the present parallel computer environment. Then, if these conditions are satisfied, the job manager 1 determines that the parallel computer environment is not changed. Accordingly, the computer system 1 determines that if the present environment has the free space, the parallel computer environment is not changed to the parallel computer environment exhibiting the lower function than the present environment. Accordingly, if the present environment has the free space, the computer resources are allocated to the programs flexibly and efficiently.

Moreover, as illustrated in T46 and T47, the job manager 1 determines whether such conditions are satisfied or not that a PROCESS having the higher priority level than N_PRIORITY is executed in the parallel computer environment X of the changing destination and that the parallel computer environment Y exhibiting the higher function than the parallel computer environment X has the free space. If these conditions are satisfied, the job manager 1 selects the parallel computer environment Y exhibiting the higher function than the parallel computer environment X as the parallel computer environment of the changing destination. This process enables the computer system to, if the parallel computer environment having the higher function has the free space, effectively use the higher-function parallel computer environment having the free space.

EXAMPLE 2

The computer system according to an example 2 will hereinafter be described with reference to FIGS. 10 through 14.

The example 1 has discussed the computer system configured such that each of the programs executed in the computer system including the plurality of parallel computer environments E=0 through E=e transmits the query event containing the execution state etc. to the job manager 1, and receives the instruction about whether the change of the parallel computer environment is needed or not. In the example 2, the parallel computer environments depicted in FIGS. 10 through 14 are applied by way of one example of the parallel computer environments E=0 through E=e, and specific operational examples will be described. Therefore, the following points are the same as those in the example 1, which are the connections between the job manager 1 and the individual parallel computer environments as depicted in FIG. 4, the function etc. of the job manager 1, the processes of the job manager 1 as illustrated in FIGS. 5 through 9, the transmission of the query event that is executed by each individual program, the process of receiving the instruction about whether the change of the parallel computer environment is needed or not, etc. Such being the case, the example 2 will be described on the assumption of following the drawings of the example 1 with respect to the same configuration and the same operation as those in the example 1.

Note that the computing node count in each parallel computer environment and the level of the communication function are managed in the parallel computer environment table of FIG. 9 in the example 1. In the example 2, however, the computing node count and the level of the communication function are embedded in the name of the parallel computer environment. For example, a parallel computer environment N16C100 represents that the computing node count is "16" and the level of the communication function is "100". If there exists the plurality of parallel computer environments each exhibiting the same computing node count and the same level of the communication function, these environments may be managed such as the parallel computer environments N16C100-1, N16C100-2. Accordingly, in the example 2, the computing node count and the level of the communication function may be omitted in the parallel computer environment table illustrated in FIG. 9.

An assumption in the example 2 is that five types of parallel computer environments exist as will be illustrated below. The architecture of the computer system does not, however, limit the number of the parallel computer environments. Further, the following parallel computer environment will be exemplified, in which the computing node count is "9" or "16". It does not, however, mean that the architecture of the computer system limits the number of the computing nodes. For example, several thousands of computing nodes or several tens of thousands of computing nodes are also available.

FIG. 10 depicts the parallel computer environment N16C100. Herein, "N16C100" is defined as information for identifying the parallel computer environment and also information for explicitly indicating specifications of the hardware resources. Namely, "N16" indicates that the computing node count is "16". In FIG. 10, the computing nodes are depicted by rectangles forming a 4-row/4-column matrix. Solid lines extending between the rectangles represent links of the network.

The symbol "C100" represents the parallel computer environment in which the communication level between the computing nodes has the highest function level. In the example 2, the level of the communication function between the computing nodes is ranked from C0 to C100. Herein, it does not mean that there are limits to the type of the communication function between the computing nodes and the way of ranking the level. For example, the level of the communication function can be set from information such as a bandwidth between the computing nodes and a node count of target computing nodes with which one computing node perform the direct communications without relaying another computing node.

FIG. 10 illustrates an example in which the computing nodes arrayed in matrix are connected respectively to the computing nodes arranged in a row direction, a column direction and a diagonal direction. Further, one front-end node 31 is provided in addition to the computing nodes counted at "16".

The front-end node 31 is connected to the job manager 1 and other parallel computer environments via the network 2 depicted in FIG. 4. The front-end node 31 accepts the program execution request from the job manager 1 or the program executed in another parallel computer environment. Then, the front-end node 31 registers the accepted program execution request in the queue for the execution of the program.

Moreover, the front-end node 31 hands over the program registered in the queue for the execution of the program to the computing node and causes this computing node to execute the program. The programs registered in the queue for the execution of the program are handed over to the computing nodes according to the priority levels set in the respective programs.

In this case, a procedure of replacing the program executed on the computing node with the program registered in the queue for the execution of the program is the same as that of the general computer system. For instance, when a period of processing time allocated to each program elapses, the execution of the program to be executed on the computing node is interrupted, and this program is again registered in the queue for the execution of the program. Then, it may be sufficient that the program is handed over to the computing node according to the priority level in the queue for the execution of the program.

Further, if the program reaches an input/output standby status before the processing time allocated to each program elapses, the execution of the program may be interrupted, and the program may be again registered in the queue for the execution of the program.

Figure 11:
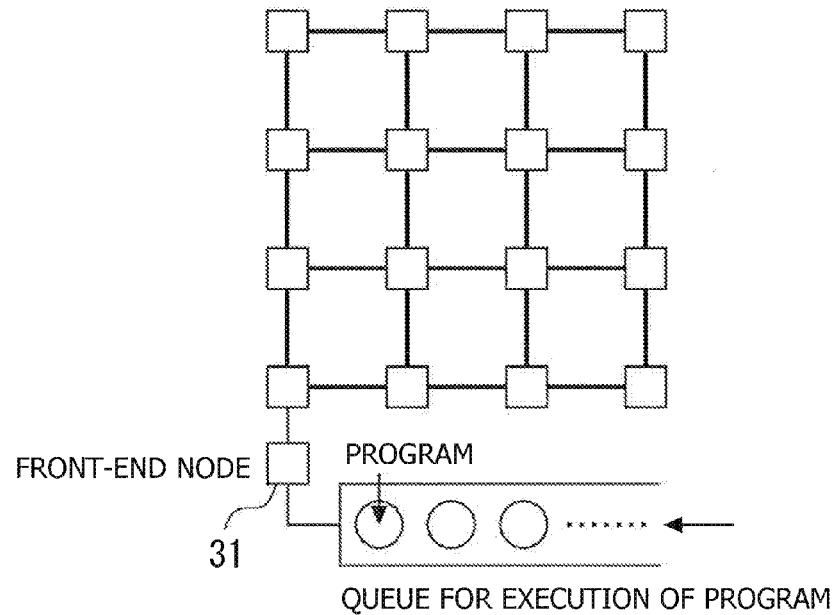
FIG. 11 is a diagram illustrating a parallel computer environment N16C50.

FIG. 11 illustrates a parallel computer environment N16C50. The computing node count of the parallel computer environment N16C50 is "16", and the communication function between the computing nodes has an average level. For example, the links in the row and column directions are established between the computing nodes arrayed in matrix, while any links in the diagonal direction are not established. Accordingly, it follows that in order for each computing node to perform the communications with the computing node positioned in the diagonal direction, a traffic flows via the adjacent computing node positioned in the row or column direction.

Figure 12:
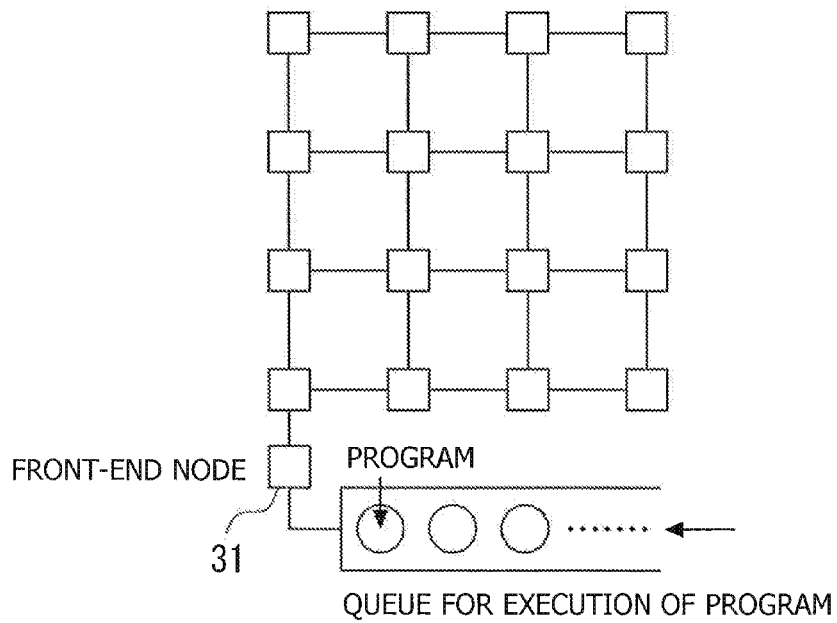
FIG. 12 is a diagram illustrating a parallel computer environment N16C0.

FIG. 12 illustrates a parallel computer environment N16C0. The computing node count of the parallel computer environment N16C0 is "16", and the communication function between the computing nodes has the lowest level. A connecting configuration among the computing nodes, i.e., a topology of the network 2 in FIG. 12 is the same as that in the parallel computer environment N16C50 in FIG. 11. In the parallel computer environment N16C0, however, a band of the link between the computing nodes is narrower than in the parallel computer environment N16C50 in FIG. 11.

Figure 13:
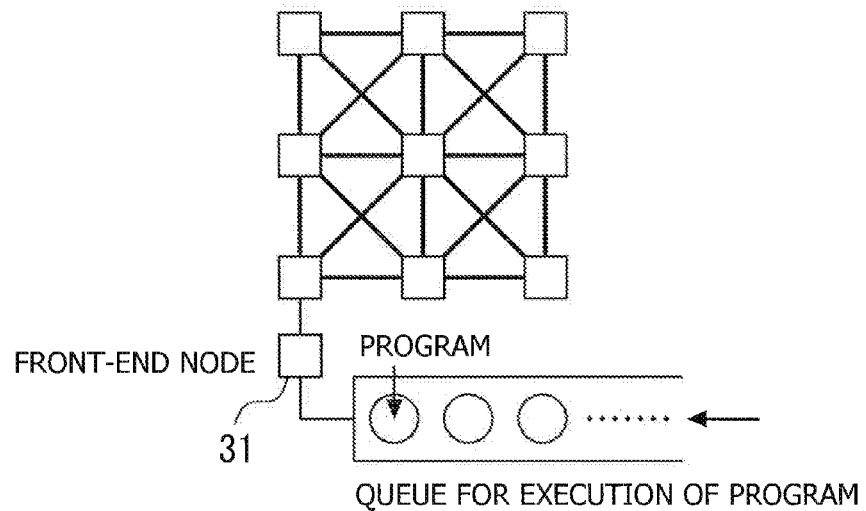
FIG. 13 is a diagram illustrating a parallel computer environment N9C100.
Figure 14:
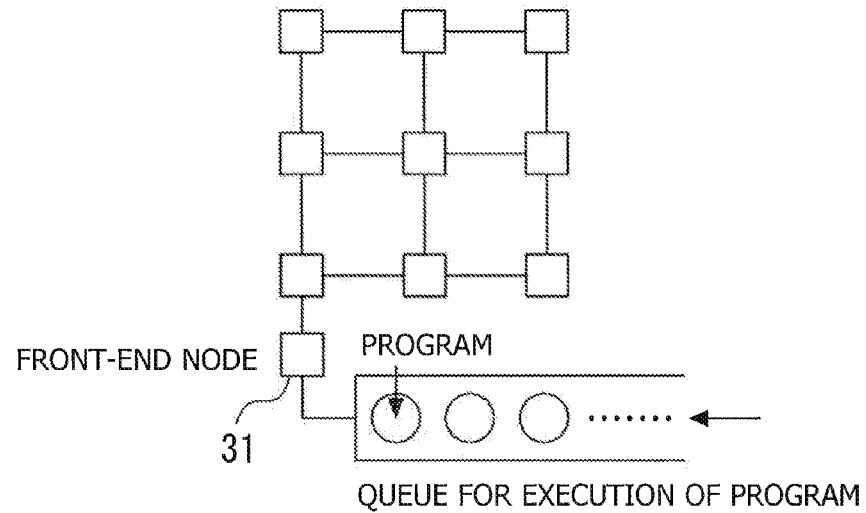
FIG. 14 is a diagram illustrating a parallel computer environment N9C0.

FIG. 13 illustrates a parallel computer environment N9C100. The computing node count of the parallel computer environment N9C100 is "9", and the communication function between the computing nodes has the highest level. FIG. 14 illustrates a parallel computer environment N9C0. The computing node count of the parallel computer environment N9C0 is "9", and the communication function between the computing nodes has the lowest level.

The following are implementation examples of a procedure of changing the execution environment of a program P. The program P is to contain descriptions of the states given as below.

```
/* R0 */
parallel_run_level (9, 16, 50, FALSE); /* D1 */
/* R1 */
parallel_run_level (9, 5, 50, FALSE); /* D2 */
/* R2 */
parallel_run_level (20, 200, 200, TRUE); /* D3 */
/* R3 */
parallel_run_level (0, 3, 0, FALSE); /* D4 */
/* R4 */
```

Moreover, the execution environment of the program P at an execution stating point R0 is to be the parallel computer environment N16C100.

A determination about the first change of the execution environment occurs by reaching a state description D1 when executing the program P on the execution environment N16C100 (step S2 in FIG. 6).

The execution environment N16C100 sends the query event of the shifting destination of the program P to the job manager 1 (steps S3, S4 in FIG. 6). After sending the query event, the execution of the program P is set in the suspending status on the execution environment N16C100 (step S5 in FIG. 6).

The job manager 1 receives the query event from the execution environment N16C100 and creates the candidates for the shifting destinations of the execution environment of the program P from the information of the state description D1 contained in the event. In this case, there are two candidates, i.e., N16C50 and N16C100, for the shifting destinations. The job manager 1 selects the execution environment N16C50 exhibiting the most inferior function from these candidates (steps T1, T2, T3, and T4 in FIG. 7). However, the execution continues on N16C100 depending on a state determination (refer to T44 in FIG. 8) added at this point of time, i.e., such a selection as not to shift is probable. Herein, it is assumed that no such selection will have occurred.

The job manager 1 sends, to the program P of the execution environment N16C100, a reply message instructing the program P to change the execution environment from N16C100 to N16C50 (step T5 in FIG. 7).

The program P kept in the execution suspending status on the execution environment N16C100 receives the reply message from the job manager 1, and changes the execution environment to N16C50 indicated by the reply message (steps S6, S7, and S8 in FIG. 6).

The program P having shifted to execution environment N16C50 is registered in the queue for the execution. When reaching the execution order in the queue for the execution, the front-end processor acquires information that specifies the program P from the queue for the execution, and restarts executing the program P on the execution environment N16C50 (steps S8, S1 in FIG. 6).

As a result of the processes described above, the program P delimited by the execution range R1 thereof is executed on the execution environment N16C50. The computer system will hereinafter process "parallel_run_level" with the same procedure.

For example, a determination about the next change of the execution environment occurs by reaching a state description D2 when executing the program P on the execution environment N16C50. Herein, the computer system changes, based on the designation N_NODE=5 implying that the computing node count may be decremented, the execution environment of the program P to the execution environment N9C50. As a result, the program P delimited by the execution range R2 thereof is executed on the execution environment N9C50.

A determination about the next change of the execution environment occurs by reaching a state description D3 when executing the program. P on the execution environment N9C50. The state description D3 implies a necessity with the highest priority for both of the computing node count and the communication function at the highest level hereinafter. This being the case, the execution of the program P is shifted to the execution environment N16C100 exhibiting the highest function.

In the state description D3, however, "ADJUST_P" is "TRUE", and hence, if the execution environment N16C100 is not temporarily used due to the fault of the hardware, another candidate is selected. For instance, the execution environment N16C50 is selected.

A determination about the final change of the execution environment occurs by reaching a state description D4 when executing the program P on the execution environment N16C100. The state description D4 implies that the priority level, the computing node count and the communication function may be at the lowest level hereinafter. This being the case, the computer system shifts the execution of the program P to the execution environment N9C0 exhibiting the lowest function.

MODIFIED EXAMPLE

In the examples 1 and 2, the job manager 1 instructs the computer program for the next parallel computer environment X in response to the query event. Then, the computer program receiving the response to the query event stores the execution format containing the context of the program being executed underway, requests the next parallel computer environment X to register the execution format in the queue for the execution. In place of this process, the job manager 1 may instruct the OS of the present parallel computer environment E executing the computer program to interrupt the execution of the program and to shift the execution environment to the next parallel computer environment X. The OS of the present parallel computer environment E which receives the instruction from the job manager 1 may store the execution format containing the context of the program being executed underway and may request the OS of the next parallel computer environment X to execute the program.

In the examples 1 and 2, the computer system includes the plurality of parallel computer environments connected via the network 2. In place of the plurality of parallel computer environments as in the examples 1 and 2, however, the procedures of the examples 1 and 2 can be applied to a case of executing the plurality of programs by use of the computer system including a plurality of virtual computers. To be specific, the parallel computer environments of the computer system are not the physically different parallel computer environments but may be the virtual computers configured on the computer system including a plurality of CPUs. Namely, the proper virtual computer is made to execute the program by conducting the process of determining what program is executed and what virtual computer executes the program in the same way as done in the processes of FIGS. 6-8, thereby enabling the efficiency of the computer system as a whole to be improved.

<Non-Transitory Computer-Readable Recording Medium>

A program for making a computer exemplified by the job manager 1, other machines and apparatuses (which will hereinafter be referred to as the computer etc.) realize any one of the functions described above can be recorded on a non-transitory recording medium readable by the computer etc. Then, the computer etc. is made to read and execute the program on this non-transitory recording medium, whereby the function thereof can be provided.

Herein, the non-transitory recording medium readable by the computer etc. connotes a non-transitory recording medium capable of accumulating information such as data and programs electrically, magnetically, optically, mechanically or by chemical action, which can be read from the computer etc. Among these non-transitory recording mediums, for example, a flexible disc, a magneto-optic disc, a CD-ROM, a CD-R/W, a DVD, a Blu-ray disc, a DAT, an 8 mm tape, a memory card such as a flash memory, etc. are given as those removable from the computer etc. Further, a hard disc, a ROM (Read-Only Memory), etc. are given as the non-transitory recording mediums fixed within the computer etc.

The present computer system enables the use efficiency of the computer system to be improved.

DESCRIPTION OF THE REFERENCE NUMERALS AND SYMBOLS

1 job manager
2 network
4 event queue
31 front-end node

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus configured to manage allocation of processes to a plurality of computers, the management apparatus comprising:
    a processor configured to execute a process including:
        receiving an event for notifying a request value containing a throughput requested for executing a program with respect to a computer resource from a program execution computer, to which execution of the program is allocated, in the plurality of computers, the event being generated when the program execution computer executes a predetermined portion in the program;
        selecting a computer having a throughput suited to the request value from within the plurality of computers when the event is received; and
        allocating the program allocated to the program execution computer to the selected computer.

2. The management apparatus according to claim 1, wherein the selecting selects a first computer exhibiting the lowest throughput in computers satisfying the request value of the throughput when there exist the computers satisfying the request value of the throughput, and selects a second computer exhibiting the highest throughput in the plurality of computers when there exist none of the computers satisfying the request value of the throughput.

3. The management apparatus according to claim 2, wherein the request value contains a priority level of executing the program, which is requested to a computer to be allocated with the program, and the process further includes inhibiting the allocation of the program from being switched over to the selected first computer when the throughput of the first computer is lower than the throughput of the program execution computer and the program execution computer is not allocated with a program exhibiting a higher priority level than the priority level of the program to be allocated to the first computer, the priority level specified by the request value.

4. The management apparatus according to claim 2, wherein the selecting, when there exist one computer allocated with a program exhibiting a higher priority level than a priority level of the program allocated to the program execution computer and satisfying the request value of the throughput and another computer having a higher throughput than the one computer but not allocated with the program exhibiting the higher priority level than the priority level allocated to the program execution computer, selects the another computer having the higher throughput as the first computer.

5. A computer system comprising:
    a plurality of computers; and
    a management apparatus configured to manage allocation of processes to the plurality of computers, the management apparatus comprising:
        a processor configured to execute a process including:
            receiving an event for notifying a request value containing a throughput requested for executing a program with respect to a computer resource from a program execution computer, to which execution of the program is allocated, in the plurality of computers, the event being generated when the program execution computer executes a predetermined portion in the program;
            selecting a computer having a throughput suited to the request value from within the plurality of computers when the event is received; and
            allocating the program allocated to the program execution computer to the selected computer.

6. The computer system according to claim 5, wherein the selecting selects a first computer exhibiting the lowest throughput in computers satisfying the request value of the throughput when there exist the computers satisfying the request value of the throughput, and selects a second computer exhibiting the highest throughput in the plurality of computers when there exist none of the computers satisfying the request value of the throughput.

7. The computer system according to claim 6, wherein the request value contains a priority level of executing the program, which is requested to a computer to be allocated with the program, and the process further includes inhibiting the allocation of the program from being switched over to the selected first computer when the throughput of the first computer is lower than the throughput of the program execution computer and the program execution computer is not allocated with a program exhibiting a higher priority level than the priority level of the program to be allocated to the first computer, the priority level specified by the request value.

8. The computer system according to claim 6, wherein the selecting, when there exist one computer allocated with a program exhibiting a higher priority level than a priority level of the program allocated to the program execution computer and satisfying the request value of the throughput and another computer having a higher throughput than the one computer but not allocated with the program exhibiting the higher priority level than the priority level allocated to the program execution computer, selects the another computer having the higher throughput as the first computer.

9. A management method of managing allocation of processes to a plurality of computers, the management method comprising:
receiving an event for notifying a request value containing a throughput requested for executing a program with respect to a computer resource from a program execution computer, to which execution of the program is allocated, in the plurality of computers, the event being generated when the program execution computer reaches a point of execution of a predetermined portion in the program;
selecting a computer having a throughput suited to the request value from within the plurality of computers by referring to information indicating respective throughputs of the plurality of computers when the event is received; and
allocating the program allocated to the program execution computer to the selected computer.

10. The management method according to claim 9, wherein the selecting selects a first computer exhibiting the lowest throughput in computers satisfying the request value of the throughput when there exist the computers satisfying the request value of the throughput, and selects a second computer exhibiting the highest throughput in the plurality of computers when there exist none of the computers satisfying the request value of the throughput.

11. The management method according to claim 10, wherein the request value contains a priority level of executing the program, which is requested to a computer to be allocated with the program, and the management method further comprises inhibiting the allocation of the program from being switched over to the selected first computer when the throughput of the first computer is lower than the throughput of the program execution computer and the program execution computer is not allocated with a program exhibiting a higher priority level than the priority level of the program to be allocated to the first computer, the priority level specified by the request value.

12. The management method according to claim 10, wherein the selecting, when there exist one computer allocated with a program exhibiting a higher priority level than a priority level of the program allocated to the program execution computer and satisfying the request value of the throughput and another computer having a higher throughput than the former computer but not allocated with the program exhibiting the higher priority level than the priority level allocated to the program execution computer, selects the another computer having the higher throughput as the first computer.

13. A non-transitory computer-readable recording medium having stored therein a program for causing a management apparatus to execute a process for managing allocation of processes to a plurality of computers, the process comprising:
receiving an event for notifying a request value containing a throughput requested for executing a program with respect to a computer resource from a program execution computer, to which execution of the program is allocated, in the plurality of computers, the event being generated when the program execution computer executes a predetermined portion in the program;
selecting a computer having a throughput suited to the request value from within the plurality of computers by referring to information indicating respective throughputs of the plurality of computers when the event is received; and
allocating the program allocated to the program execution computer to the selected computer.

14. The non-transitory computer-readable recording medium according to claim 13, wherein the selecting selects a first computer exhibiting the lowest throughput in computers satisfying the request value of the throughput when there exist the computers satisfying the request value of the throughput, and selects a second computer exhibiting the highest throughput in the plurality of computers when there exist none of the computers satisfying the request value of the throughput.

15. The non-transitory computer-readable recording medium according to claim 14, wherein the request value contains a priority level of executing the program, which is requested to a computer to be allocated with the program, and the process further comprises inhibiting the allocation of the program from being switched over to the selected first computer when the throughput of the first computer is lower than the throughput of the program execution computer and the program execution computer is not allocated with a program exhibiting a higher priority level than the priority level of the program to be allocated to the first computer, the priority level specified by the request value.

16. The non-transitory computer-readable recording medium according to claim 14, wherein the selecting, when there exist one computer allocated with a program exhibiting a higher priority level than a priority level of the program allocated to the program execution computer and satisfying the request value of the throughput and another computer having a higher throughput than the one computer but not allocated with the program exhibiting the higher priority level than the priority level allocated to the program execution computer, selects the another computer having the higher throughput as the first computer.

* * * * *